April 14, 1953          H. W. BORER          2,634,751

LEAKPROOF VALVE

Filed March 12, 1949          2 SHEETS—SHEET 1

INVENTOR
HERBERT W. BORER
BY
*Wesley P. Merrill*
ATTORNEY

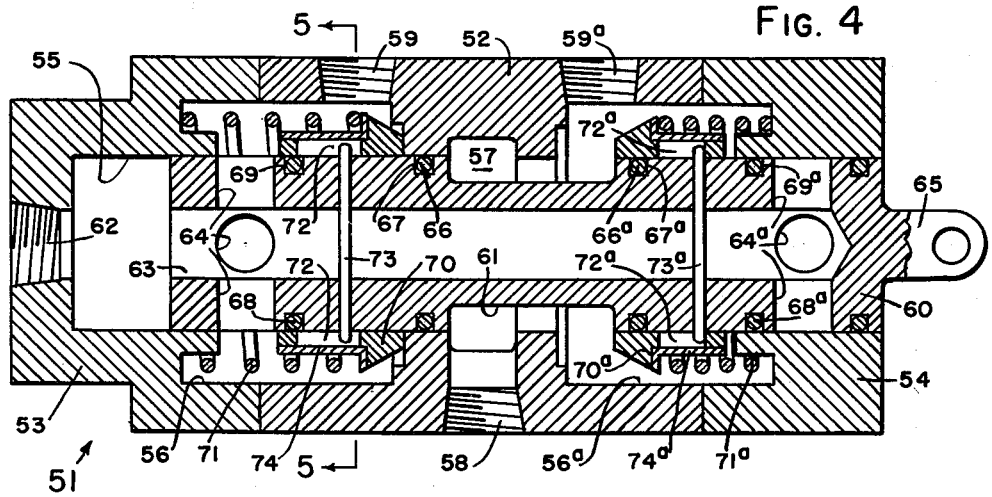

Patented Apr. 14, 1953

2,634,751

UNITED STATES PATENT OFFICE 2,634,751

LEAKPROOF VALVE

Herbert W. Borer, Milwaukee, Wis., assignor to The Oilgear Company, Milwaukee, Wis., a corporation of Wisconsin Application March 12, 1949, Serial No. 81,031

8 Claims. (Cl. 137—622)

1

This invention relates to valves of the type employed to control the delivery of liquid from a pump to a hydraulic motor which is to be operated at predetermined speeds.

Such a valve includes a valve body, a bore formed in the body, two or more ports communicating with the bore and a valve member which is fitted in the bore and is adjustable between a position in which it connects one port to another and a position in which it blocks communication between two ports.

The valve member ordinarily is closely fitted in the bore but, in order that it may readily be shifted from one position to another, there must be sufficient clearance between it and the wall of the bore to accommodate a lubricating film of liquid therebetween and to permit the member to be shifted by a relatively small force.

When liquid under pressure is supplied to one of the ports, the pressure will cause the lubricating film to flow from that port toward and into a low pressure area at a rate proportional to the pressure. Liquid thus leaking through the clearance between the valve member and the wall of the bore reduces the volume of liquid delivered by the pump to the motor but the amount of leakage is so small relatively to the capacity of the valve that under many circumstances the motor speed may be maintained close enough to the desired speed.

However, hydraulic motors are often employed to do work which requires that the motor at times be operated at a very slow speed which should be maintained substantially constant. In such a case, the rate at which the pump would deliver liquid to the motor to cause it to operate at the desired low speed is so small that the leakage through the valve would be a substantial part of the liquid delivered by the pump. Since the pressure created by the pump is proportional to the load on the motor and since the leakage through the valve is substantially proportional to the pressure, a substantial variation in the load on the motor would cause a wide variation in the speed of the motor.

The present invention has as an object to provide a valve through which there is substantially no leakage.

A valve constructed according to the invention has the advantage that a motor controlled by it may be operated at a substantially constant speed.

Other objects and advantages of the invention will appear from the following description of the valves and hydraulic circuits shown schematically in the accompanying drawings in which the views are as follows:

Fig. 4 is a longitudinal section through another valve in which the invention is embodied.

Fig. 5 is a transverse section taken on the line 5—5 of Fig. 4.

Fig. 6 is a diagram of a hydraulic circuit in which the valve of Fig. 5 may be employed.

Figure 1:
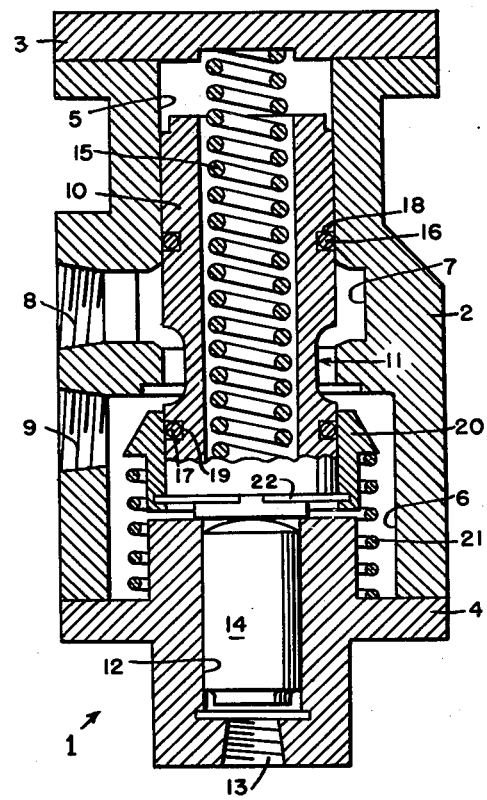
Fig. 1 is a longitudinal section through a valve in which the invention is embodied.

The valves shown in Figs. 1 and 4 are provided with identical means for preventing leakage, the valve of Fig. 1 being a bypass valve and the valve of Fig. 4 being a directional control valve. While only two types of valves have been shown, it is to be understood that the invention is not limited to those two types but may be incorporated in other types of valves.

Figs. 1–3

The valve, which is indicated in its entirety by the numeral 1, has been shown and will be described herein as being arranged in a vertical position but it may be arranged in any desired position. As shown, valve 1 has its mechanism arranged within a valve body consisting of a main body part 2 and two end heads 3 and 4 which are securely fastened to the upper and lower ends, respectively, of part 2 in any suitable manner to form fluid tight joints therebetween.

Body part 2 is provided with an axial bore 5, a counterbore 6 which is concentric with bore 5 at the lower end thereof, an annular groove 7 which is formed in the wall of bore 5 and two pipe connections 8 and 9 by means of which valve 1 may be connected into a hydraulic circuit. Connection 8 communicates with groove 7 and forms therewith an inlet port while connection 9 communicates with counterbore 6 and forms therewith an outlet port.

Communication between the inlet port and the outlet port is controlled by a valve member or plunger 10 which is fitted in bore 5 and extends into counterbore 6. Plunger 10 is provided intermediate its ends with a peripheral groove 11 which connects groove 7 and counterbore 6 when plunger 10 is in the position shown in Fig. 1.

End head 4 extends into counterbore 6 and has formed therein a cylinder 12 and a pipe connection 13 through which liquid may be supplied to cylinder 12. A piston 14 is fitted in cylinder 12 and forms therewith a servo-motor for moving plunger 10 upward against the action of a spring 15 which is arranged within plunger 10 and reacts against end head 3. Spring 15 urges plunger 10 downward and normally holds the lower end thereof against the inner end of end head 4.

Plunger 10 necessarily is made enough smaller in diameter than bore 5 to permit it to be shifted easily from one to the other of its two positions. Consequently, there is a very slight clearance between plunger 10 and the wall of bore 5 and, if no other sealing means were provided, liquid could leak through that clearance from groove 7 into counterbore 6 and into the upper end of bore 5 whenever there was pressure in groove 7.

Figure 2:
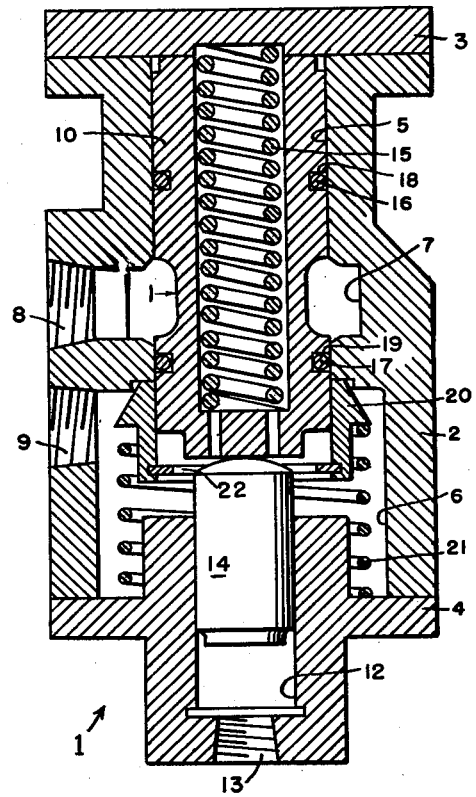
Fig. 2 is a view similar to Fig. 1 but showing the valve member in a position different from that shown in Fig. 1.

In order to prevent leakage of liquid, plunger 10 is provided with a sealing ring at each side of groove 11. As shown, two "O-ring" packings 16 and 17 are arranged, respectively, in two grooves 18 and 19 which are formed in the periphery of plunger 10. Groove 18 is so located that ring 16 engages the wall of bore 5 above groove 7 in all positions of plunger 10. Groove 19 is so located that, when plunger 10 is in its upper position as shown in Fig. 2, ring 17 engages the wall of bore 5 between the lower edge of groove 7 and the lower end of bore 5. The depth of each of grooves 18 and 19 is less than the cross-sectional diameter of the ring therein so that the rings are firmly pressed against the wall of bore 5. Consequently, when plunger 10 is in the position shown in Fig. 2, rings 16 and 17 prevent any leakage of liquid from groove 7.

When a high pressure prevails in groove 7, when a low or zero pressure prevails in counterbore 6 and when ring 17 is in contact with the wall of bore 5, pressure extends from groove 7 through the clearance between plunger 10 and the wall of bore 5 into the upper part of groove 19 so that the upper side of ring 17 is exposed to a high pressure while the lower side thereof is exposed to the low or zero pressure prevailing in counterbore 6. Therefore, just before ring 17 moves completely out of contact with the wall of bore 5 during downward movement of plunger 10, the high pressure in the upper part of groove 19 would blow ring 17 out of groove 19 and into counterbore 6 if preventative means were not provided.

In order to prevent ring 17 from being blown out of groove 19 by the pressure therein, a sleeve 20 is fitted upon the lower part of plunger 10, sleeve 20 is urged against the upper end of counterbore 6 by a spring 21 arranged between the lower wall of counterbore 6 and a flange on sleeve 20 and which is considerably weaker than spring 15, and a snap ring 22 is fitted in the lower end of sleeve 20 and is spaced from the lower end of plunger 10 when plunger 10 is in the position shown in Fig. 2.

The arrangement is such that, when plunger 10 is in the position shown in Fig. 2 and cylinder 12 is opened to drain, spring 15 will move plunger 10 downward and ring 17 will pass directly from bore 5 into sleeve 20 and thereby prevent it from being blown out of groove 19 by the pressure therein. After ring 17 has entered sleeve 20, the lower end of plunger 10 will engage snap ring 22 and will move sleeve 20 downward, thereby connecting groove 7 to counterbore 6 through groove 11. When liquid is supplied to cylinder 12, piston 14 will move plunger 10 upward and sleeve 20 will be moved upward with plunger 10 by spring 21 until sleeve 20 engages the upper end of counterbore 6. Then ring 17 will pass directly from sleeve 20 into bore 5 during continued upward movement of plunger 10.

Figure 3:
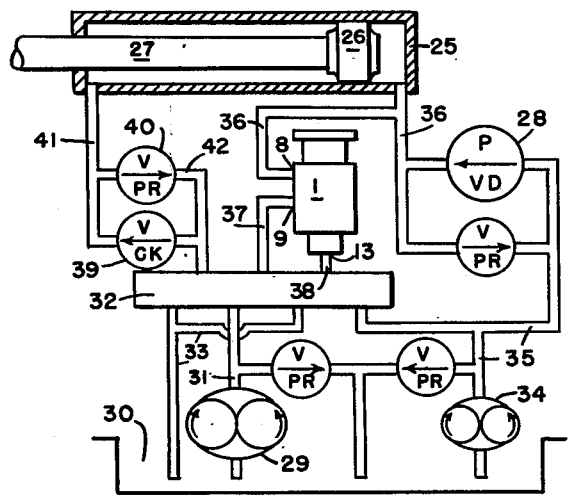
Fig. 3 is a diagram of a hydraulic circuit showing one method of connecting the valve of Fig. 1 to a hydraulic motor.

Valve 1 is adapted to be used for various purposes but, since it has only two ports, it ordinarily is employed to bypass a pump when the liquid discharged by that pump is not needed such, for example, as in the hydraulic circuit shown in Fig. 3 in which a hydraulic motor consisting of a cylinder 25, a piston 26 and a piston rod 27 is adapted to be operated at slow speed in one direction by liquid delivered thereto by a small capacity high pressure pump 28 or to be operated at high speed in either direction by liquid delivered thereto by a large capacity rapid traverse pump 29 which draws liquid from a reservoir 30 and discharges it through a channel 31 into a control valve 32 which is adapted to connect channel 31 to one end or the other of cylinder 25 or to a drain channel 33 which discharges into reservoir 30.

Pump 28 ordinarily is adjustable to vary its rate of delivery and is compensated for variations in temperature and pressure. That is, it has incorporated therein mechanism which in response to a variation in temperature or a variation in pressure will vary the displacement of the pump just enough to compensate for the variation in slip or leakage due to such variation in temperature or pressure and thereby maintain the delivery rate constant. Such pumps are well known and in extensive use.

As shown, pump 28 is supercharged by a gear pump 34 which draws liquid from reservoir 30 and discharges it into a channel 35 which is connected to the inlet of pump 28 and also to control valve 32. The outlet of pump 28 is connected by a channel 36 to the head end of cylinder 25 and also to connection 8 in valve 1, the connection 9 of which is connected by a channel 37 to control valve 32. Valve 1 has been shown as having a pipe connection 13 which is connected to valve 32 by a channel 38 but in practice the bodies of the two valves are sometimes connected directly to each other.

The rod end of cylinder 25 is connected to valve 32 through a foot valve which permits liquid to flow freely to cylinder 25 but resists the discharge of liquid therefrom. The foot valve has been represented in Fig. 3 by a check valve 39 and a resistance valve 40. As shown, the rod end of cylinder 25 is connected by a channel 41 to the outlet of check valve 39 and to the inlet of resistance valve 40 and valve 32 is connected by a channel 42 to the inlet of check valve 39 and to the outlet of resistance valve 40.

The arrangement is such that, when valve 32 is adjusted to one position, channels 31, 37, and 38 are connected to drain channel 33 so that pump 29 can discharge through valve 32 into channel 33 and spring 15 can hold plunger 10 in its Fig. 1 position to permit pump 28 to discharge through valve 1, channel 37 and valve 32 into channel 33.

When valve 32 is adjusted to a second position, channel 38 remains open to channel 33 so that valve 1 remains open, channel 31 is connected to channel 37 and channel 42 is connected to channel 33. The liquid discharged by pump 29 will flow through channel 31, valve 32, channel 37, valve 1 and channel 36 to the head end of cylinder 25 and the liquid discharged by pump 28 will also flow through channel 36 to the head end of cylinder 25 so that piston 26 is moved toward the left at high speed by the combined output of pumps 28 and 29. Liquid expelled from cylinder 25 by piston 26 will flow through channel 41, resistance valve 40, channel 42 and valve 32 into channel 33.

When valve 32 is adjusted to a third position, channels 31 and 42 are connected to channel 33, so that pump 29 is bypassed and liquid can escape from the rod end of cylinder 25, and channel 38 is connected to channel 35 which permits liquid from pump 34 to enter cylinder 12 and cause piston 14 to raise plunger 10 to its Fig. 2 position so that no liquid can escape through valve 1. The liquid discharged by pump 28 will enter cylinder 25 and will move piston 26 toward the left at a slow speed as determined by the adjustment of pump 28, and the liquid expelled by piston 26 will flow into drain channel 33 through the same channels as when valve 32 was in its second position. Piston 26 will move at a constant speed for the reason that the delivery of pump 28 remains constant and no liquid can escape through valve 1 as explained above.

When valve 32 is adjusted to a fourth position, channel 38 is connected to drain channel 33 so that valve 1 can open, channel 31 is connected to channel 42 so that liquid from pump 29 can flow therethrough and through check valve 39 and channel 41 to the rod end of cylinder 25 and move piston 26 toward the right at high speed, and channel 37 is connected to channel 33 so that the liquid expelled from cylinder 25 by piston 26 and the liquid discharged by pump 28 can flow through channel 36, valve 1, channel 37 and valve 32 into drain channel 33.

*Figs. 4–6*

The valve shown in these figures, which is indicated in its entirety by the numeral 51, has been shown and will be described as being arranged in a horizontal position but it may be arranged in any desired position. Valve 51 includes a valve body shown as consisting of a central part 52 and two end parts 53 and 54 which are securely fastened to opposite ends of part 52 in any suitable manner to form fluid tight joints therebetween.

Body 52–54 is provided with an axial bore 55, two spaced apart counterbores 56 and 56ª which are concentric with bore 55 and are spaced from the ends thereof, and an annular groove 57 which is formed in the wall of bore 55 between and spaced from counterbores 56 and 56ª. Groove 57 communicates with an inlet port 58 which extends therefrom through wall of body part 52 for connection to a source of motive liquid. Counterbores 56 and 56ª communicate, respectively, with two distributing ports 59 and 59ª which extend therefrom through the wall of body part 52 for connection to a motor or other device or devices.

Communication between groove 57 and counterbores 56 and 56ª is controlled by a valve member or plunger 60 which is closely fitted in bore 55 and is provided intermediate its ends with a perpiheral groove 61 for connecting groove 57 to one or the other of counterbores 56 and 56ª. When plunger 60 is in its right hand position as shown in Fig. 4, groove 57 communicates with counterbore 56ª through groove 61 and communication between groove 57 and counterbore 56 is blocked. When plunger 60 is in its left hand position, groove 57 communicates with counterbore 56 through groove 61 and communication between groove 57 and counterbore 56ª is blocked.

In order that valve 51 may be employed to control the return of liquid from a motor or other device or devices to which ports 59 and 59ª are connected, body part 53 has been shown as being provided with a return port 62 which communicates with bore 55 at the left end thereof and plunger 60 has been shown as having an axial bore 63 extending into it from its left end and communicating with a plurality of radial passages 64 and a plurality of radial passages 64ª. When plunger 60 is in its right hand position as shown in Fig. 4, passages 64 communicate with counterbore 56 and passages 64ª are blocked and, when plunger 60 is in its left hand position, passages 64ª communicate with counterbore 56ª and passages 64 are blocked. Plunger 60 is adapted to be moved from one to the other of its two positions by means of a stem 65 fixed to the right end thereof.

In order to prevent leakage through the clearance between the periphery of plunger 60 and the wall of bore 55, sealing rings are arranged at opposite ends of groove 61 and sealing rings are arranged inward from passages 64 and 64ª. As shown, two O-ring packings 66 and 66ª are arranged, respectively, in two grooves 67 and 67ª which are formed in the periphery of plunger 60 adjacent to but spaced from opposite ends of groove 61, and two O-ring packings 68 and 68ª are arranged, respectively, in two grooves 69 and 69ª which are formed in the periphery of plunger 60 adjacent to but spaced from the inner edges of passages 64 and 64ª, respectively.

The depth of each groove containing an O-ring packing is less than the cross-sectional diameter of the ring therein so that, when plunger 60 is in its right hand position, rings 66 and 68ª are firmly pressed against the wall of bore 55 and prevent any leakage from groove 57 into counterbore 56 or from counterbore 56ª into bore 63 and, when plunger 60 is in its left hand position, rings 66ª and 68 are firmly pressed against the wall of bore 55 and prevent any leakage from groove 57 into counterbore 56ª or from counterbore 56 into bore 63.

In order to prevent rings 66 and 66ª from being blown out of their grooves as they move out of contact with the wall of bore 55 during movement of plunger 60 in one direction or the other, plunger 60 has two sleeves 70 and 70ª fitted thereon and arranged within counterbores 56 and 56ª respectively.

When plunger 60 is in its right hand position, sleeve 70 is held against the inner end of counterbore 56 by a spring 71 and it remains in that position until movement of plunger 60 toward the left causes ring 66 to enter sleeve 70 and then sleeve 70 is caused to move with plunger 60 to open communication between groove 57 and counterbore 56. As shown, sleeve 70 is provided with two diametrically opposed slots 72 to receive the ends of a pin 73 which is inserted through plunger 60 in such a position that it engages the outer ends of slots 72 after ring 66 is within sleeve 70, thereby causing sleeve 70 to move with plunger 60 during continued movement thereof toward the left. Pin 73 may be retained in position by being tightly fitted in plunger 60 but it has been shown as being retained in position by an annular retainer 74 which extends around sleeve 70 and is held in position by spring 71.

Sleeve 70ª functions in the same way that sleeve 70 functions, it is urged toward the left by a spring 71ª and it is provided with opposed slots 72ª to receive the ends of a pin 73ª which extends through plunger 60 and is retained in position by an annular retainer 74ᵃ arranged upon sleeve 70ᵃ.

For the purpose of illustration, valve 51 has been shown in Fig. 6 as being connected into a hydraulic circuit to control the flow of liquid to and from a cylinder 75 having fitted therein a piston 76 which is to be moved in opposite directions at high speed and to be moved in one or both of those directions at a slow constant speed but valve 51 is not limited to such use as it may be connected into various other hydraulic circuits.

As shown, valve 51 has its port 59 connected to the left end of cylinder 75 by a channel 77, its port 59ᵃ connected to the right end of cylinder 75 by a channel 78, its port 58 connected to the outlet of a variable displacement feed pump 79 by a channel 80 and its port 62 connected by a channel 81 to the inlet of a resistance valve 82 and the outlet of a check valve 83, the outlet of resistance valve 82 and the inlet of check valve 83 being connected to a drain channel 84 which discharges into a reservoir 85.

Liquid for operating motor 75—76 at slow constant speed is supplied by feed pump 79 which is of the type having incorporated therein mechanism to maintain the volumetric output of the pump at a constant predetermined rate regardless of variations in pump pressure or variations in the temperature of the liquid. Pump 79 is supercharged by a gear pump 86 which draws liquid from reservoir 85 and discharges it into a branched supply channel 87 one branch of which is connected to the intake of pump 79.

Liquid for operating motor 75—76 at high speed is supplied by a rapid traverse pump 88 which draws liquid from reservoir 85 and discharges it through a channel 89 into a two-position bypass valve 90 which is connected through a channel 91 and a check valve 92 to channel 80 and which also has a branch of drain channel 84 connected thereto. When valve 90 is in one of its positions, it will direct liquid from pump 88 through channel 91, check valve 92 and channel 80 into valve 51 which will direct liquid to one end or the other of cylinder 75 and, when valve 90 is in its other position, it will connect channel 89 to drain channel 84 so that pump 88 is bypassed.

Feed pump 79 is provided with displacement varying mechanism which may be adjusted to a desired position to cause the pump to discharge liquid at any rate between zero and maximum. Feed pump 79 is also provided with a servo-motor 93 for shifting the displacement varying mechanism between any predetermined position and its zero displacement position. Servo-motor 93 is connected to a two-position pump control valve 94 which also has connected thereto a branch of supply channel 87 and a drain channel 95 which discharges into reservoir 85. The arrangement is such that, when valve 94 is in one position, it direct liquid from pump 86 to servo-motor 93 which will then adjust pump 79 to cause it to deliver liquid at the preset rate and, when valve 94 is in its other position, it will connect servo-motor 93 to drain channel 95 and thereby cause pump 79 to be adjusted to zero displacement.

Valve 51 has been shown as having its stem 65 connected to the rod of a piston 96 which is fitted in a cylinder 97 and forms therewith a servo-motor for shifting valve plunger 60 from one to the other of its two positions. Cylinder 97 has opposite ends thereof connected, respectively, by two channels 98 and 99 to a two-position pilot valve 100 which also has connected thereto a branch of supply channel 87 and a drain channel 101 which discharges into reservoir 85.

When valve 100 is in one of its positions, liquid from channel 87 will flow therethrough and through channel 98 to cylinder 97 and will cause piston 96 to move valve plunger 60 to its right hand position, and the liquid expelled from cylinder 97 by piston 96 will flow through channel 99 and valve 100 into drain channel 101. When valve 100 is in its other position, liquid from channel 87 will flow therethrough and through channel 99 to cylinder 97 and will cause piston 96 to move valve plunger 60 to its left hand position, and the liquid expelled from cylinder 97 by piston 96 will flow through channel 98 and valve 100 into drain channel 101. During movement of valve plunger 60 toward the left, liquid is expelled from the left end of bore 55 through channel 81 and resistance valve 82 into drain channel 84. During movement of valve plunger 60 toward the right, it will draw liquid from reservoir 85 through drain channel 84, check valve 83 and channel 81 into the left end of bore 55.

With valve plunger 60 in its right hand position so that port 58 is open to port 59ᵃ and port 59 is open to port 62, with valve 94 adjusted to connect channel 87 to servo-motor 93 so that pump 79 is caused to deliver liquid into channel 80 at a predetermined rate and with valve 90 adjusted to connect channel 89 to channel 91 so that the output of pump 88 is directed through check valve 92 into channel 80, the entire output of both pumps 79 and 88 will flow through valve 51 and channel 78 to the right end of cylinder 75 and cause piston 76 to move toward the left at high speed and to eject liquid from cylinder 75 through channel 77, valve 51, channel 81, resistance valve 82 and channel 84 into reservoir 85.

If valve 90 is then adjusted to connect channel 89 to drain channel 84 so that pump 88 is bypassed, the liquid discharged by pump 79 will continue to move piston 76 toward the left but at a slow speed which will remain constant for the reason that none of the liquid discharged by pump 79 can leak out of the system due to check valve 92 and sealing rings 66 and 68ᵃ. If valve plunger 60 is shifted to its left hand position, the system will operate as explained above except that piston 76 will move toward the right. If valve 94 is adjusted to connect servo-motor 93 to drain channel 95 so that pump 79 is adjusted to zero displacement and if valve 90 is adjusted to connect channel 89 to drain channel 84 so that pump 88 is bypassed, piston 76 will stop.

The valve herein set forth may be modified in various ways and adapted to various uses without departing from the scope of the invention which is hereby claimed as follows:

1. A valve comprising a valve body having formed therein a bore and a counterbore adapted to communicate with said bore at one end thereof, said body also having formed therein an inlet port which communicates with said bore intermediate the ends thereof and an outlet port which communicates with said counterbore, a unitary valve plunger closely fitted in said bore and extending into said counterbore, said plunger being provided intermediate its ends with a cannelure and being shiftable between a first position in which it blocks communication between said ports and a second position in which said cannelure connects said ports to each other, an annular groove formed in the peripheral surface of said plunger at one side of said cannelure and so located that it is entirely within the portion of said bore between said inlet port and said counterbore when said plunger is in its first position, a resilient sealing ring having a cross-sectional diameter greater than the depth of said groove fitted in said groove to provide a seal between said ports when said plunger is in its first position, a sleeve arranged within said counterbore and fitted upon said plunger, means for urging said sleeve toward said inlet port and tending to hold it against the end of said counterbore so that said sealing ring will move into said sleeve during the first part of the movement of said plunger from its first position to its second position, and means operable by said plunger only after said ring has entered said sleeve for moving said sleeve away from the end of said counterbore during the remaining part of the movement of said plunger from its first position to its second position.

2. A valve comprising a valve body having formed therein a bore and a counterbore adapted to communicate with said bore at one end thereof, said body also having formed therein an inlet port which communicates with said bore and is spaced from said counterbore an outlet port which communicates with said counterbore, a unitary valve plunger closely fitted in said bore and extending into said counterbore, said plunger being provided intermediate its ends with a cannelure and being shiftable between a first position in which it blocks communication between said ports and a second position in which said cannelure connects said ports to each other, an annular groove formed in the peripheral surface of said plunger at one side of said cannelure and so located that it is entirely within the portion of said bore between said inlet port and said counterbore when said plunger is in its first position, a resilient sealing ring having a cross-sectional diameter greater than the depth of said groove fitted in said groove to provide a seal between said ports when said plunger is in its first position, a sleeve arranged within said counterbore and fitted upon said plunger, a spring for urging said sleeve toward said inlet port and tending to hold it against the end of said counterbore, a first abutment carried by said plunger, and a second abutment carried by said sleeve in alinement with said first abutment and being spaced therefrom when said plunger is in its first position so that during movement of said plunger from its first position to its second position said ring will enter said sleeve and thereafter said first abutment will engage said second abutment and move said sleeve away from the end of said counterbore.

3. A valve comprising a valve body having formed therein a bore and a counterbore adapted to communicate with said bore at one end thereof, said body also having formed therein an inlet port which communicates with said bore intermediate the ends thereof and an outlet port which communicates with said counterbore, a unitary valve plunger closely fitted in said bore and extending into said counterbore, said plunger being provided intermediate its ends with a cannelure and being shiftable between a first position in which it blocks communication between said ports and a second position in which said cannelure connects said ports to each other, hydraulic means for shifting said plunger from one to the other of said positions, an annular groove formed in the peripheral surface of said plunger at one side of said cannelure and so located that it is entirely within the portion of said bore between said inlet port and said counterbore when said plunger is in its first position, a resilient sealing ring having a cross-sectional diameter greater than the depth of said groove fitted in said groove to provide a seal between said ports when said plunger is in its first position, a sleeve arranged within said counterbore and fitted upon an end portion of said plunger, a spring for urging said sleeve toward said inlet port and tending to hold it against the end of said counterbore, a first abutment carried by said plunger, a second abutment carried by said sleeve in alinement with said first abutment and being spaced therefrom when said plunger is in its first position so that during movement of said plunger from its first position to its second position said ring will enter said sleeve and thereafter said first abutment will engage said second abutment and move said sleeve away from the end of said counterbore, and a second sealing ring fitted in the peripheral surface of said plunger at the other side of said cannelure to provide a seal between said inlet port and the other end of said bore.

4. A valve comprising a valve body having an axial bore and an inlet port communicating with said bore, a valve plunger fitted in said bore and provided with a cannelure which communicates with said port in all positions of said plunger, said body also having two spaced apart counterbores formed therein around said plunger at opposite sides of said port and two distributing ports communicating with said counterbores respectively, said plunger being shiftable in opposite directions between a first position in which said cannelure connects said inlet port to one of said counterbores and a second position in which said cannelure connects said inlet port to the other of said counterbores, said plunger having two annular grooves formed in the peripheral surface thereof at opposite sides of said cannelure and so located that one of said grooves is entirely within the portion of said bore between said inlet port and one of said counterbores when said plunger is in the position in which said cannelure connects said inlet port with the other of said counterbores, two resilient sealing rings fitted in said grooves respectively to provide a seal between said inlet port and one of said counterbores in each position of said plunger, each of said sealing rings having a normal cross-sectional diameter slightly greater than the depth of the groove in which it is fitted, a sleeve arranged within each of said counterbores and fitted upon said plunger, means for urging said sleeves toward said inlet port and tending to hold said sleeves against the ends of said counterbores so that one or the other of said sealing rings will enter one or the other of said sleeves during movement of said plunger in one direction or the other, and means operable by said plunger only after a sealing ring has entered a sleeve for causing that sleeve to move with said plunger.

5. A valve comprising a valve body having an axial bore and an inlet port communicating with said bore, a valve plunger fitted in said bore and provided with a cannelure which communicates with said port in all positions of said plunger, said body also having two spaced apart counterbores formed therein around said plunger at opposite sides of said port and two distributing ports communicating with said counterbores respectively, said plunger being shiftable in opposite directions between a first position in which said cannelure connects said inlet port to one of said counterbores and a second position in which said cannelure connects said inlet port to the other of said counterbores, said plunger having two annular grooves formed in the peripheral surface thereof at opposite sides of said cannelure and so located that one of said grooves is entirely within the portion of said bore between said inlet port and one of said counterbores when said plunger is in the position in which said cannelure connects said inlet port with the other of said counterbores, two resilient sealing rings fitted in said grooves respectively to provide a seal between said inlet port and one of said counterbores in each position of said plunger, each of said sealing rings having a normal cross-sectional diameter slightly greater than the depth of the groove in which it is fitted, a sleeve arranged within each of said counterbores and fitted upon said plunger, a spring for urging each of said sleeves against the end of the counterbore containing that sleeve, an abutment carried by each sleeve, and two abutments carried by said plunger, said abutments being so located that during movement of said plunger in one direction or the other one of said sealing rings will enter one of said sleeves and thereafter the sleeve containing that sealing ring will be moved away from the end of the counterbore by the abutment on that sleeve being engaged by an abutment on said plunger.

6. A valve comprising a valve body having an axial bore and an inlet port communicating with said bore, a valve plunger fitted in said bore and provided with a peripheral groove which communicates with said port in all positions of said plunger, said body also having two spaced apart counterbores formed therein around said plunger at opposite sides of said port and two distributing ports communicating with said counterbores respectively, said plunger being shiftable in opposite directions between a first position in which said groove connects said inlet port to one of said counterbores and a second position in which said groove connects said inlet port to the other of said counterbores, two sealing rings fitted in the peripheral surface of said plunger at opposite sides of said groove to provide a seal between said inlet port and a counterbore in each of the two positions of said plunger, a sleeve arranged within each of said counterbores and fitted upon said plunger, a spring for urging each of said sleeves against the end of the counterbore containing that sleeve, and two pins carried by said plunger and arranged within said sleeves respectively, each of said sleeves being provided with a slot to receive the end of one of said pins and said slots and pins being so arranged that during movement of said plunger in one direction or the other one of said sealing rings will enter one of said sleeves and then one of said pins will engage the end of the slot in the sleeve containing that ring and will cause that sleeve to move with said plunger.

7. A valve according to claim 4 in which the valve body is provided with a return port and the valve plunger is provided with means for connecting either of the distributing ports to said return port during the time that the inlet port is connected to the other distributing port.

8. A valve according to claim 5 in which the valve body is provided with a return port and the valve plunger is provided with means for connecting either of the distributing ports to said return port during the time that the inlet port is connected to the other distributing port.

HERBERT W. BORER.

References Cited in the file of this patent

UNITED STATES PATENTS

| Number | Name | Date |
|---|---|---|
| 1,293,858 | Mills | Feb. 11, 1919 |
| 1,385,019 | Mathieu | July 19, 1921 |
| 2,327,830 | Stevenson | Aug. 24, 1943 |
| 2,420,394 | Gilman | May 13, 1947 |